United States Patent [19]

Bakker

[11] 4,314,106
[45] Feb. 2, 1982

[54] LINE CIRCUIT

[75] Inventor: Pieter Bakker, Hilversum, Netherlands

[73] Assignee: U.S. Philips Corporation, New York, N.Y.

[21] Appl. No.: 142,275

[22] Filed: Apr. 21, 1980

[30] Foreign Application Priority Data

May 10, 1979 [NL] Netherlands ............... 7903664

[51] Int. Cl.³ .................. H04B 1/58; H04Q 1/28
[52] U.S. Cl. ........................ 179/16 F; 179/170 NC
[58] Field of Search .......... 179/170 NC, 16 F, 16 A, 179/18 F, 18 FA, 81 R, 81 B, 170 R, 170 T

[56] References Cited

U.S. PATENT DOCUMENTS

| 4,004,109 | 1/1977 | Boxall | 179/170 NC |
| 4,037,065 | 7/1977 | Nahay | 179/170 NC |
| 4,041,252 | 8/1977 | Cowden | 179/170 NC |
| 4,086,447 | 4/1978 | Schindler et al. | 179/170 NC |
| 4,142,075 | 2/1979 | Olschewski | 179/170 NC |
| 4,203,012 | 5/1980 | Boxall | 179/170 NC |

Primary Examiner—Thomas A. Robinson
Attorney, Agent, or Firm—Thomas A. Briody; William J. Streeter; Laurence A. Wright

[57] ABSTRACT

A line circuit comprising a terminal for connection of a wire of a subscriber's line for applying thereto a line current which is determined by the impedance of the subscriber's line and an alternating current which is superimposed on the line current, the circuit further comprising an amplifier and a current injection circuit connected to the output of the amplifier for supplying a portion of the line current, determined by the impedance of the current injection circuit, the amplifier supplying the remaining portion of the line current.

7 Claims, 2 Drawing Figures

LINE CIRCUIT

The invention relates to a line circuit comprising a supply source and an amplifier having a low output impedance, which amplifier is connected to the supply source and a connecting terminal for applying by means of the line circuit a direct current, originating from the supply source, to a subscriber's line wire which is connected to the terminal.

BACKGROUND OF THE INVENTION

Such a line circuit wherein the direct current is produced by the amplifier is known from the U.S. Pat. No. 4,041,252.

Subscriber's exchanges operating on the basis of time-division multiplex or small signal spatial networks require a cheap subscriber's line circuit on a "one per line" basis. This requires the highest possible integration degree of the circuit.

The supply source comprises a d.c. voltage source for the supply of the direct current. The value of the direct current depends on the length of the subscriber's line. To ensure a line current of a sufficient value for very long lines, the voltage of the voltage source is normally 48 or 60 volts. Consequently, the line current for very short lines or in case of a short circuit on the subscriber's line can be very high. Telephone administrations therefore prescribe a 400 to 800 Ohm supply resistor arranged in series with the supply source, by means of which the maximum line current is limited to 100 to 120 mA. As a subscriber's line is a two-wire transmission line, the line circuit comprises a second amplifier which is connected so that the line circuit has a symmetrical construction. The supply resistor then serves as a terminating impedance for the line divided into two impedances, each having a value of 200 to 400 Ohm. To prevent these impedances from converting common mode signals on the subscriber's line into differential mode signals, the administrations require an accuracy of approximately 0.1% for these impedances. Owing to the high value of the maximum line current, the output transistors of the amplifiers dissipate a relatively high power. This dissipation in the portion to be integrated has formed so far an obstacle for the use of these circuits with the life and reliability required for telephony systems.

It is an object of the invention to mitigate this drawback and to provide a line circuit whose dissipation in the active components of the line circuit is very low so that they can be easily realised in integrated form.

SUMMARY OF THE INVENTION

The line circuit according to the invention is therefore characterized in that the line circuit comprises an impedance multiplying circuit and that the line circuit comprises a current injection device connected to the output of the amplifier for applying a certain portion of the direct current, which portion is determined by the impedance of the current injection device, to the wire of the subscriber's line, the remaining smaller portion of the direct current being supplied by the amplifier.

Applying at least a portion of the direct current to the terminal, by-passing the output transistor, results in a reduction of the dissipation in the output transistor, so that this transistor can be more easily realised in integrated form.

In accordance with a further feature of the invention, the amplifier has a defined gain factor and, to realize the impedance multiplying circuit, the output of the amplifier is connected to the terminals via a resistor, a feedback circuit comprising a reference voltage is arranged between the connecting terminal and a signal input of the amplifier for the feedback of a portion of the voltage difference between the voltage of the terminal and the voltage of the reference voltage source and the current injection device comprises a d.c. voltage source coupled to the impedance, the portion of the direct current produced by this device flowing through this impedance. This has the advantage that the resistor which is connected between the output of the amplifier and the terminal has a value, which is lower by an amount determined by the feedback factor, than the value required by the administrations, the difference value being formed by the impedance in the current injection device, so that a small resistor, having an accuracy of 0.1%, which dissipates a power which is smaller by an amount corresponding with the feedback factor and which consequently, is cheap and sufficient. It would then also be possible for the resistor connected between the amplifier output and the terminal to be realized in integrated form.

In accordance with a suitable embodiment, the line circuit is characterized in that the amplifier is a differential amplifier having a signal non-inverting input and a signal inverting input, the output of the amplifier being connected to the signal inverting input and in that the feedback circuit comprises a voltage divider connected between a pole of the reference voltage source and the terminal, the tap of the voltage divider being connected to the signal input of the amplifier which is the signal non-inverting input.

In accordance with a particularly advantageous embodiment the line circuit is characterized in that the d.c. voltage source comprises a pulse generator, the impedance comprises an inductance connected to the pulse generator and in that a rectifying circuit is connected to the inductance and coupled to the amplifier output.

This results in a very low total dissipation of the line circuit, so that this circuit can be constructed for the major part in integrated form and which also achieves the result that the packing density of such line circuits on p.c. boards in racks of telephone exchanges is high.

BRIEF DESCRIPTION OF THE DRAWINGS

The invention and its advantages will now be further described with reference to the embodiment shown in the drawings, corresponding components in the different Figures having been given the same reference numerals and wherein.

DESCRIPTION OF THE PREFERRED EMBODIMENTS

Figure 1:
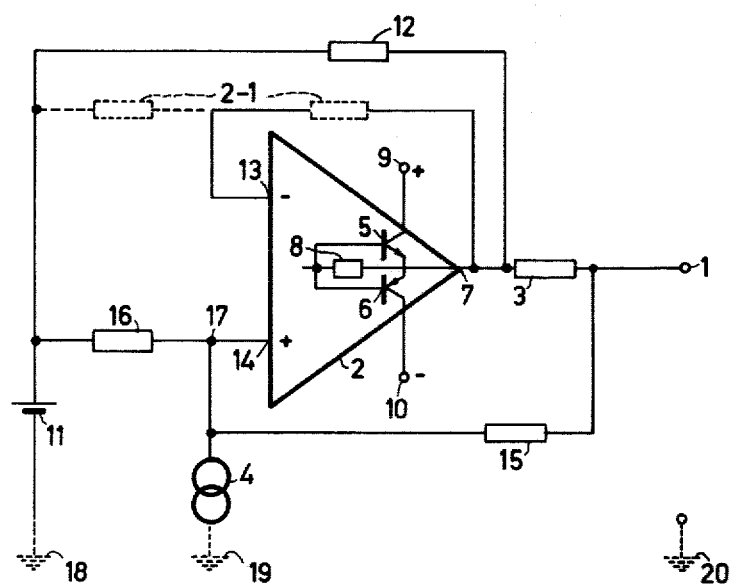
FIG. 1 shows a portion of a line circuit according to the invention.

The portion of a line circuit shown in FIG. 1 comprises a connecting terminal 1 for the connection of a wire of a subscriber's line, not shown, for example the a-wire. A speech signal supplied by a signal source, which is formed by current source 4, is applied to this wire via a feedback amplifier 2 and a resistor 3. The amplifier 2 comprises an output stage which, in this embodiment, comprises two complementary output transistors 5 and 6. These transistors 5 and 6 are connected as emitter followers, so that the output impedance of the amplifier 2, which is low-ohmic due to the feedback, is extra low. A resistor 8 is connected between the interconnected bases of the transistors 5 and 6 and the emitters in order to reduce, on reversal of the current direction, the non-linear distortion which is the result of the double base-emitter voltage gap during the take-over of the conducting state of one of the transistors by the other transistor. The drawing does not show the coupling of the bases of the transistors to the input of the amplifier because this coupling is not important for the invention, although it is required for the operation of the amplifier. In addition, the collector of the transistor 5 is connected to the positive pole 9 and the collector of the transistor 6 to the negative pole 10 of a voltage source, not shown, which functions as the supply source.

A direct current, which is prescribed by the administrations, must be applied to and taken off, respectively, the subscribers line, a wire of which is connected to terminal 1. This direct current has, for example, a minimum value of 20 mA for very long lines and, for example, a maximum value of 120 mA for very short lines or in case of a short-circuit on the line. Normally, this line current flows from the positive pole 9 to the terminal 1, via the main current path of transistor 5, or, when an inverse line polarity is used, from the terminal 1 to the negative pole 10 via the main current path of transistor 6. It should be noted that when only one line polarity is used, one of the output transistors 5 and 6 can be dispensed with. For the amplification of the speech signals supplied by the current source 4, the transistors require a collector voltage of approximately 6 Volts. With a line current of approximately 80 mA the dissipation in the current-carrying output transistor is 480 mW. However, a complete line circuit comprises two of these amplifiers, which means a total dissipation of 960 mW, which makes the realisation in integrated form more difficult.

In order to reduce this dissipation, the line circuit comprises a current injection device. In this embodiment this current injection device comprises a voltage source 11, which is associated with the supply source, and a resistor 12 which is connected to the low-ohmic output 7 of the amplifier 2. In response to the low output impedance of the amplifier 2 the current injection device produces, at a suitable choice of the voltage of the voltage source 11 and the value of the resistor 12, a portion or all of the line current for the subscriber's line. Consequently, the line current does not flow through the transistors 5 or 6, so that the amplifier 2 can be easily realized in integrated form. By providing the resistor 12 outside the chip of the integrated portion of the line circuit the dissipation takes place outside the chip.

It should be noted here that the collectors of the output transistors 5 and 6, respectively, may be connected to the output 7 and the emitters to the positive pole 9 and to the negative pole 10, respectively, of the voltage source, not shown. The base of each of these output transistors must then be driven with respect to the voltages of these poles 9 and 10. By providing a feedback it is then also possible to realise a low output impedance.

As described earlier in this description, the administrations prescribe a minimum current of 20 mA, which is obtained by using a 48 V or 60 V voltage source, for very long subscriber's lines. In order to limit the current in case of very short subscriber's lines or a short circuit on the lines, the administrations prescribe a supply resistor of 200 to 400 Ohm in series with each of the wires of a subscriber's line. At a line current of 100 mA each of these resistors then dissipates 2 to 4 Watt.

Owing to the fact that these resistors also constitute the terminating impedances of the subscriber's line for alternating current signals, the administrations require these resistance values to be accurate to within approximately 0.1%. These precision resistors, suitable for the above-mentioned dissipation, are rather expensive.

One of the measures to offset this is, that the amplifier has a defined gain factor. In this embodiment this is realised by constructing the amplifier 2 as a differential amplifier whose signal-inverting input 13 is connected to the output 7, the signal source 4 being connected to the signal non-inverting input 14. The amplifier 2 thus constructed has a gain factor of unity. However, any arbitrary fixed gain factor can be used, such as can be obtained by means of the feedback circuit 2-1, shown in FIG. 1 by means of a dotted line. Likewise, any amplifier having a defined gain factor may be used.

The line circuit further comprises, in addition to the above-described resistor 3, which is connected between the output 7 and the terminal 1, a feedback circuit comprising a reference voltage source. In this embodiment the voltage source 11 of the current injection device is used as the reference voltage source. However, it is possible to use separate sources, having different voltage values, for both uses. The feedback circuit comprises a voltage divider formed by the resistors 15 and 16, the centre tap of which is connected to the signal non-inverting signal input 14 of the differential amplifier 2. An impedance multiplication of the resistor 3 is obtained in this manner. It is readily apparent that the output impedance $R_o$, considered from the terminal 1, is equal to $$R_o = \frac{R_{15} + R_{16}}{R_3 + R_{15}} \cdot R_3$$

at a very high gain factor of the amplifier 2 without feedback. The reference numerals of the resistors, denoted by R, correspond to the reference numerals of the resistors shown in FIG. 1. With a suitable choice of the values of these resistors, for example $R_{15} = 1$ K Ohm and $R_{16} = 9$ k Ohm an output impedance $R_o$ of 200 and 400 Ohm, respectively, is obtained at a value of 20 and 40 Ohm, respectively, for $R_3$. At 100 mA the resistor $R_3$ then dissipates only 0.2 and 0.4 Watt respectively, for which cheap resistors, having an accuracy of 0.1% are available. The remaining 180 and 360 Ohm, respectively, of the terminating resistors or supply resistors are formed by the electronic impedance of the transistors 5 and 6. If the line current were to flow through the output transistor, this would have the drawback that the dissipation in the transistors 5 and 6 would be considerable. However, the current injection device applies at least a portion of the line current to the terminal 1, by-passing the transistors 5 and 6.

With a suitable choice of the resistor 12, the line current can flow to the terminal 1, fully by-passing transistors 5 and 6, namely from source 11 via the resistor 12 and the resistor 3. The transistors 5 and 6 are then adjusted in class B. The value of the resistor 12 must then be 180 Ohm and 360 Ohm, respectively.

Thus, the situation is obtained that only resistors of 20 and 30 Ohms, respectively, having an accuracy of 0.1% are used, which dissipate a relatively low power and the dissipation is prevented from occurring in the transistors 5 and 6. The other resistors have a value of 180 and 360 Ohms, respectively, so that they dissipate a relatively high power. However, these resistors need not be accurrate.

When the direct current is not fully compensated, for example when the transistors 5 and 6 are operated in class A, these transistors carry, for example, a direct current of approximately 10 mA, necessary for speech signal amplification. However, the dissipation produced thereby in the output transistors can be neglected.

Figure 2:
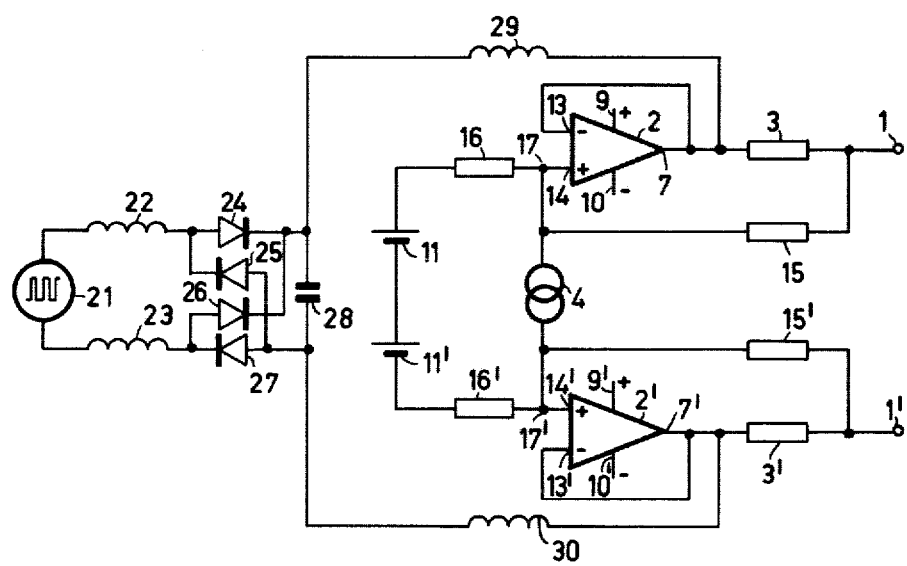
FIG. 2 shows a complete embodiment of a line circuit according to the invention.

The embodiment of FIG. 1 shows only one control stage of a line circuit, this control stage being shown relative to a virtual earth 18, 19 and 20 (shown by means of a dotted line). This virtual earth represents a symmetry plane for the speech signals in a complete line circuit, as shown in FIG. 2. It should be noted that this plane may be located at half the battery voltage if the negative pole of the d.c. voltage source or reference voltage source 11, is connected to ground.

FIG. 2 shows the two control stages of the line circuit, the components of the second control stage, which are identical to those of the first control stage, having been given the same reference numerals, provided with a prime. The connecting terminals 1 and 1' serve for the connection of the a and b wires of a subscriber's line. In addition, this embodiment shows a separate voltage source for the current injection device and the reference voltage source. The voltage source of the current injection device further comprises a pulse source 21, two coils 22 and 23, connected to the pulse source 21, a rectifying circuit, formed by the diodes 24 to 27, inclusive, connected to the coils and a filter, connected to the rectifier bridge, this filter comprising a smoothing capacitor 28 and two coils 29 and 30 of, for example, 20 mH. The current injection device is connected to the outputs 7 and 7' of the differential amplifiers 2 and 2' via the filter. This current injection device operates as follows. The current produced by the current source 21 flows through the impedance which is formed by the coils 22 and 23, before rectification in the rectifying circuit 24 to 27, inclusive, and, after having been smoothed by the filter, it is, for example, injected as a direct current at the output 7 of the amplifier 2 or derived from the output 7' of the amplifier 2'. The impedances formed by the inductances of the coils 22 and 23 must be of such a value that they replace the current limitation by the resistors of, for example, 200 Ohms and 400 Ohms, respectively. With a pulse repetition rate of 100 kHz this requires coils having an inductance of 0.32 and 0.64 mH, respectively. This circuit has the advantage that the dissipation in the line circuit is very low. The only components which still dissipate line current are the resistors 3 and 3'.

What is claimed is:

1. A line circuit comprising: a connecting terminal, a supply source, an amplifier having a low output impedance, said amplifier being connected to said supply source and said connecting terminal for applying, by means of the line circuit, a predetermined direct current originating from said supply source to a wire of the subscriber's line which is connected to said connecting terminal, said line circuit also comprising an impedance multiplying circuit and a current injection device connected to the output of said amplifier for applying a portion, determined by the impedance of said current injection device, of the direct current to the wire of the subscriber's line, whereby the remaining smaller portion of said predetermined direct current is supplied by said amplifier.

2. A line circuit as claimed in claim 1, wherein said amplifier has a defined gain factor in order to realize the impedance multiplying circuit, the output of said amplifier being connected to said connecting terminal via a resistor and wherein a feedback circuit comprising a reference voltage source is arranged between said connecting terminal and a signal input of said amplifier for feeding back a portion of the difference between the voltage of said connecting terminal and the voltage of said reference voltage source and wherein said current injection device comprises a d.c. voltage source coupled to the impedance, the portion of the line current supplied by said current injection device flowing through this impedance.

3. A line circuit as claimed in claim 2, wherein said amplifier is a differential amplifier having a signal non-inverting and a signal inverting input, the output of said amplifier being coupled to the signal inverting input and wherein the feedback circuit comprises a voltage divider arranged between a pole of the reference voltage source and said connecting terminal, the tap of said voltage divider being connected to the signal input, constituted by the signal non-inverting input, of said amplifier.

4. A line circuit as claimed in claim 3, wherein the output of said amplifier is connected to the signal inverting input via a feedback circuit which comprises a further reference voltage source.

5. A line circuit as claim in claim 2, wherein said impedance has a value which is substantially equal to the output impedance of said amplifying circuit less said value of the resistor.

6. A line circuit as claimed in claim 2, wherein the d.c. voltage source comprises a pulse generator, said impedance comprises an inductance connected to said pulse generator and wherein a rectifying circuit is provided connected to said inductance and coupled to the output of said amplifier.

7. A line circuit as claimed in claim 2, wherein said impedance is a resistor which is connected between the d.c. voltage source and the output of said amplifier.

* * * * *